United States Patent [19]

Harscoet et al.

[11] Patent Number: 5,615,401
[45] Date of Patent: Mar. 25, 1997

[54] VIDEO AND AUDIO DATA PRESENTATION INTERFACE

[75] Inventors: Philippe Harscoet, Fremont; Chen-Huei Chiang, Sunnyvale, both of Calif.

[73] Assignee: Sigma Designs, Inc., Fremont, Calif.

[21] Appl. No.: 221,164

[22] Filed: Mar. 30, 1994

[51] Int. Cl.⁶ .............................. G06F 13/24; G06F 15/00
[52] U.S. Cl. ............................................ 395/681; 395/806
[58] Field of Search .................................. 395/650, 700, 395/154

[56] References Cited

U.S. PATENT DOCUMENTS

| | | | |
|---|---|---|---|
| 5,111,292 | 5/1992 | Kuriacose et al. | 358/133 |
| 5,111,409 | 5/1992 | Gasper et al. | 395/154 |
| 5,122,875 | 6/1992 | Raychaudhuri et al. | 358/133 |
| 5,157,716 | 10/1992 | Naddor et al. | 379/105 |
| 5,168,356 | 12/1992 | Acampora et al. | 358/133 |
| 5,191,410 | 3/1993 | McCalley et al. | 379/105 |
| 5,208,745 | 5/1993 | Quentin et al. | 395/154 |
| 5,231,492 | 7/1993 | Dangi et al. | 358/143 |
| 5,289,276 | 2/1994 | Siracusa et al. | 348/467 |
| 5,339,413 | 8/1994 | Koval et al. | 395/650 |
| 5,375,068 | 12/1994 | Palmer et al. | 395/153 |
| 5,392,239 | 2/1995 | Margulis et al. | 365/189.01 |
| 5,397,853 | 3/1995 | Koguchi | 369/70 |
| 5,416,749 | 5/1995 | Lai | 365/240 |
| 5,426,756 | 6/1995 | Shyi et al. | 395/425 |
| 5,428,730 | 6/1995 | Baker et al. | 395/154 |
| 5,434,913 | 7/1995 | Tung et al. | 395/800 |
| 5,450,544 | 9/1995 | Dixon et al. | 395/164 |
| 5,471,576 | 11/1995 | Yee | 395/154 |
| 5,487,167 | 1/1996 | Dinallo et al. | 395/650 |

*Primary Examiner*—Kevin A. Kriess
*Assistant Examiner*—John Q. Chavis
*Attorney, Agent, or Firm*—D'Alessandro & Ritchie

[57] ABSTRACT

Presentation of digital video and audio data in a computer system. Am application program may call upon a driver program to manipulate streams of video and audio data, including commands to present the video or audio to an operator, retrieve status information about the presentation, simultaneously present graphics with video data, halt or pause presentations, allocate or release resources for presentation, and group multiple streams for synchrony. The driver program may operate upon the grouped streams in synchrony in response to unified commands from the application program. An interface to the driver program may comprise a interrupt instruction invoked with a designated interrupt and a designated set of commands: initialization; open and close; play, pause, stop, seek, and step; group; set and get; installation; and termination. The driver program may be called upon using a standardized interface for such functions, in which the application program may indicate a designated set of parameters for each function call.

14 Claims, 4 Drawing Sheets

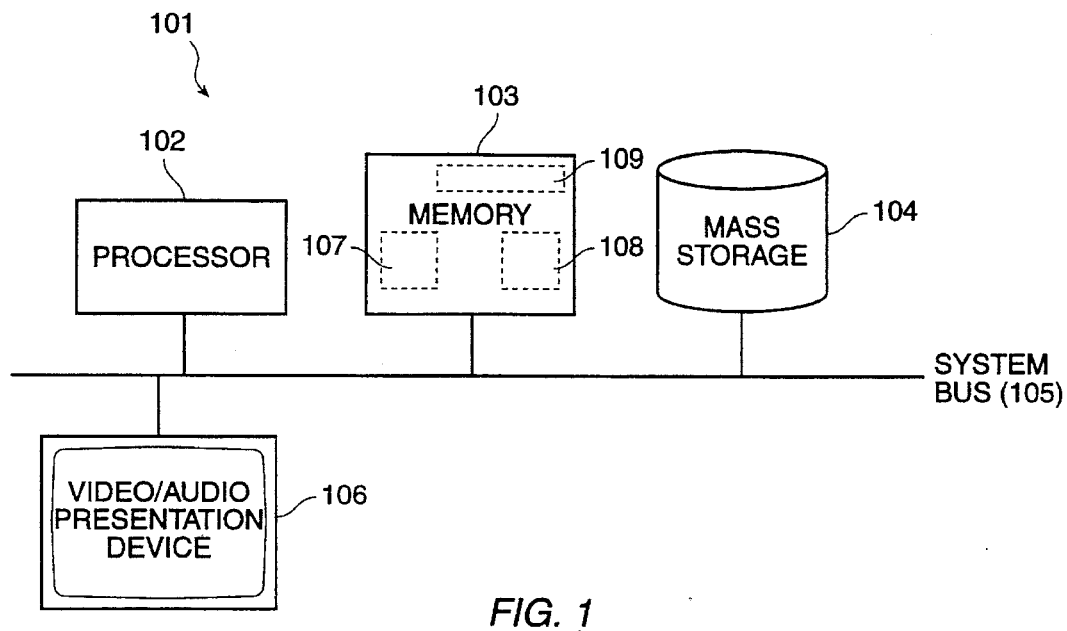
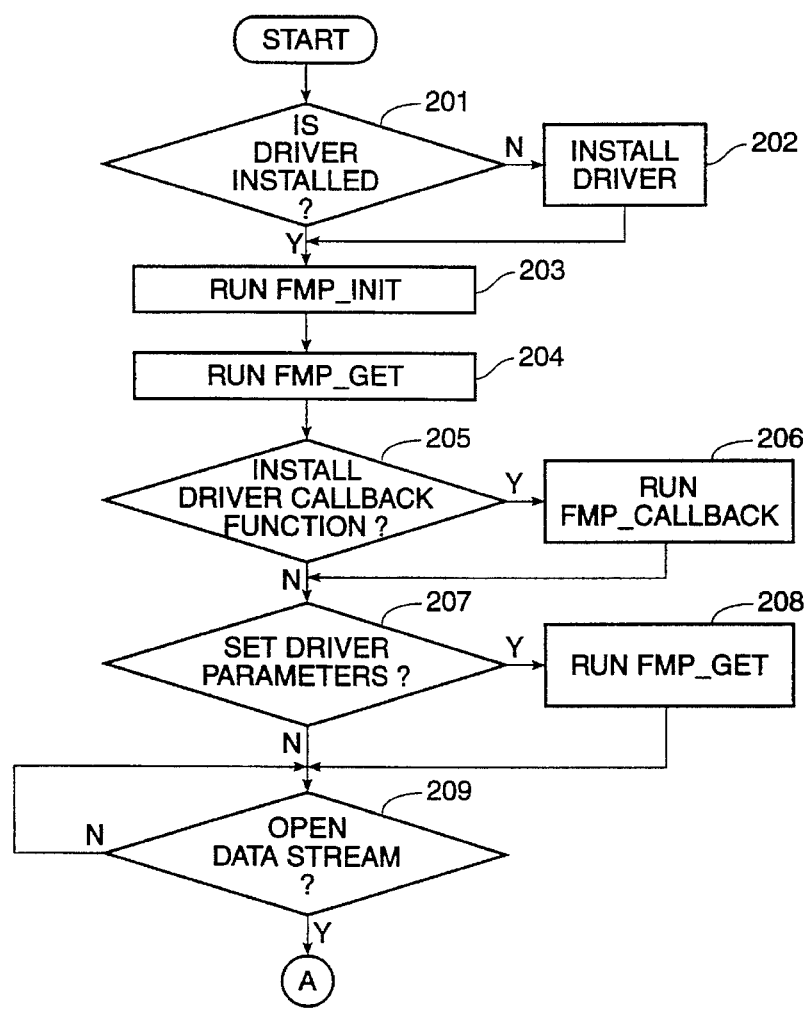
FIG. 1
FIG. 2A

VIDEO AND AUDIO DATA PRESENTATION INTERFACE

BACKGROUND OF THE INVENTION

1. Field of the Invention

This invention relates to a video and audio data presentation interface.

2. Description of Related Art

Known computer systems, particularly personal computer systems known as "PC"s, often have coupled peripheral devices that are able to perform some special function. For example, a peripheral device may be coupled to a computer system for presenting video or audio to an operator, such as by displaying pictures or producing sounds for the operator to view and hear. It is generally desirable to place these peripheral devices under the control of a central processing unit (CPU). Particularly, it is generally desirable to control the operation of these peripheral devices from an application program executing on the CPU.

One known method for controlling a peripheral device from an application program is use of a "driver" program. A driver program may be installed with an operating system for the CPU (it may be installed with installation of the operating system, or it may be added later), and may be responsive to a designated interrupt. The application program may execute the designated interrupt to cause the driver program to operate, and may pass arguments, such as control signals or data, to the driver program for its use. The driver program may then control the peripheral device directly.

While this method achieves the purpose of controlling the peripheral device, it has the drawback that two or more driver programs may attempt to use the same designated interrupt. This problem has sometimes been addressed by "chaining", in which the operating system may first assign the interrupt to the driver program that was most recently installed. If this driver program does not recognize the function which the application calls on it to perform, it may cause the operating system to select the driver program that was next-most-recently installed. Chaining may be repeated until some driver program responds to the interrupt, or until an error is returned to the application program.

Chaining is subject to drawbacks. First, if the chain of driver programs that must be selected in turn is too long, response to the application program will be slow. This can be a particularly serious problem in the case of presentation of video and audio data. Slow response may cause the presentation to vary significantly from a realistic presentation.

Second, a chain of driver programs, each attempting to respond to the same designated interrupt, has been found to be prone to error. A relatively innocuous programming error in the operating system, or a relatively minor ambiguity in the arguments used to call upon the driver program, can cause the wrong driver program to be selected. When the wrong driver program is selected, results for the application program are generally unpredictable at best, and catastrophic at worst.

Accordingly, it would be desirable to use a limited number of designated interrupts while avoiding the drawbacks of chaining.

Another drawback of the prior art is related to presentation of video and audio data. Generally, a first peripheral device may be used for video display, while a second peripheral device may be used for audio presentation. Accordingly, different driver programs may be used to control the different devices. However, commonly an application program seeks to present video and audio in synchrony, and must thus attempt to coordinate its commands to different driver programs to achieve that result.

Although some known drivers provide commands for synchronizing data streams, the application program is still generally required to call upon the driver program for each data stream separately. This can increase the complexity of the application program, particularly where there are a multitude of commands to be issued to the driver program. For example, in presentation of video and audio data, there may be commands for "FAST FORWARD", "PLAY", "PAUSE", "REWIND", and "STOP". It would be advantageous if a group of data streams that are to be synchronized could be treated by the application program as a single data stream, so that only a single command to the driver program would be required to manipulate the entire group.

Another drawback of the prior art is that application programs (or at least their programmers) are generally required to comprehend the nature of the peripheral device to make full use of the driver program's commands. For example, if the application program seeks to display both video data and graphics on a single display, it must generally comprise a fair amount of knowledge about how the peripheral device will respond to commands to do so. It would be advantageous if the driver program would handle this for the application program. This would simplify application programs and allow the driver program to use information about the nature of the video and audio peripheral devices, which would otherwise be easy for the application program to mistake.

Another drawback of the prior art is that application programs may desire to provide video or audio data for presentation, but this is not well supported by prior art. For example, the application program may generate the video or audio data itself, may generate the video or audio data in response to data it retrieves from a file, or may retrieve video or audio data from another device (such as a video camera, an MPEG capture device, or a communication device, such as one coupled to a modem or to a T1 communication line). Known interfaces for presentation of video and audio data do not provide operations to make such operation convenient.

Accordingly, it is an object of this invention to provide an improved method for presentation of video and audio data.

SUMMARY OF THE INVENTION

The invention provides an improved method for presentation of digital video and audio data in a computer system, in which the video or audio data may be generated by an application program or may be retrieved from a recorded medium. In a preferred embodiment, an application program may call upon a driver program to manipulate streams of video and audio data, including commands to (1) present the video or audio to an operator, (2) retrieve status information about the presentation, (3) simultaneously present graphics with video data, (4) halt or pause presentations, (5) allocate or release resources for presentation, and (6) group multiple streams for synchrony. The driver program may operate upon the grouped streams in synchrony in response to unified commands from the application program.

In a preferred embodiment, an interface to the driver program may comprise a interrupt instruction invoked with a designated interrupt and one or more of the following commands:

(1) an initialization command—to initialize the driver program;

(2) open and close commands—to open and close a data stream, respectively;

(3) play, pause, stop, seek, and step commands—to present a data stream, pause a presentation, stop a presentation, relocate to a designated position in a data stream, and step increment a data stream, respectively;

(4) a group command—to designate multiple streams as a group to be synchronized;

(5) set and get commands—to set and get parameters (of the driver or a data stream), respectively;

(6) installation commands, including a callback command and a signal command—to install a callback function or a signal for a data stream, respectively; and (7) a termination command—to terminate and release resources for the driver program.

In a preferred embodiment, the driver program may be called upon using a standardized interface for such functions, in which video and audio data for presentation may be treated uniformly whether the data is generated by an application program or retrieved from a recorded medium. In the standard interface, the application program may indicate the following set of parameters for each function call: an identifier of which command is called upon, an indicator for which data stream is to be manipulated, a set of data flags, a data value or data pointer (which may be modified to comprise a returned data value or data pointer), and a register reserved for a returned error code.

BRIEF DESCRIPTION OF THE DRAWINGS

FIG. 1 shows a block diagram of a computer system including a video data presentation device.

FIGS. 2A, 2B, 2C, and 2D (collectively called "FIG. 2") show a flow diagram of an interface between an application program and a device for presenting video and audio data.

DESCRIPTION OF THE PREFERRED EMBODIMENT

Figure 2B:
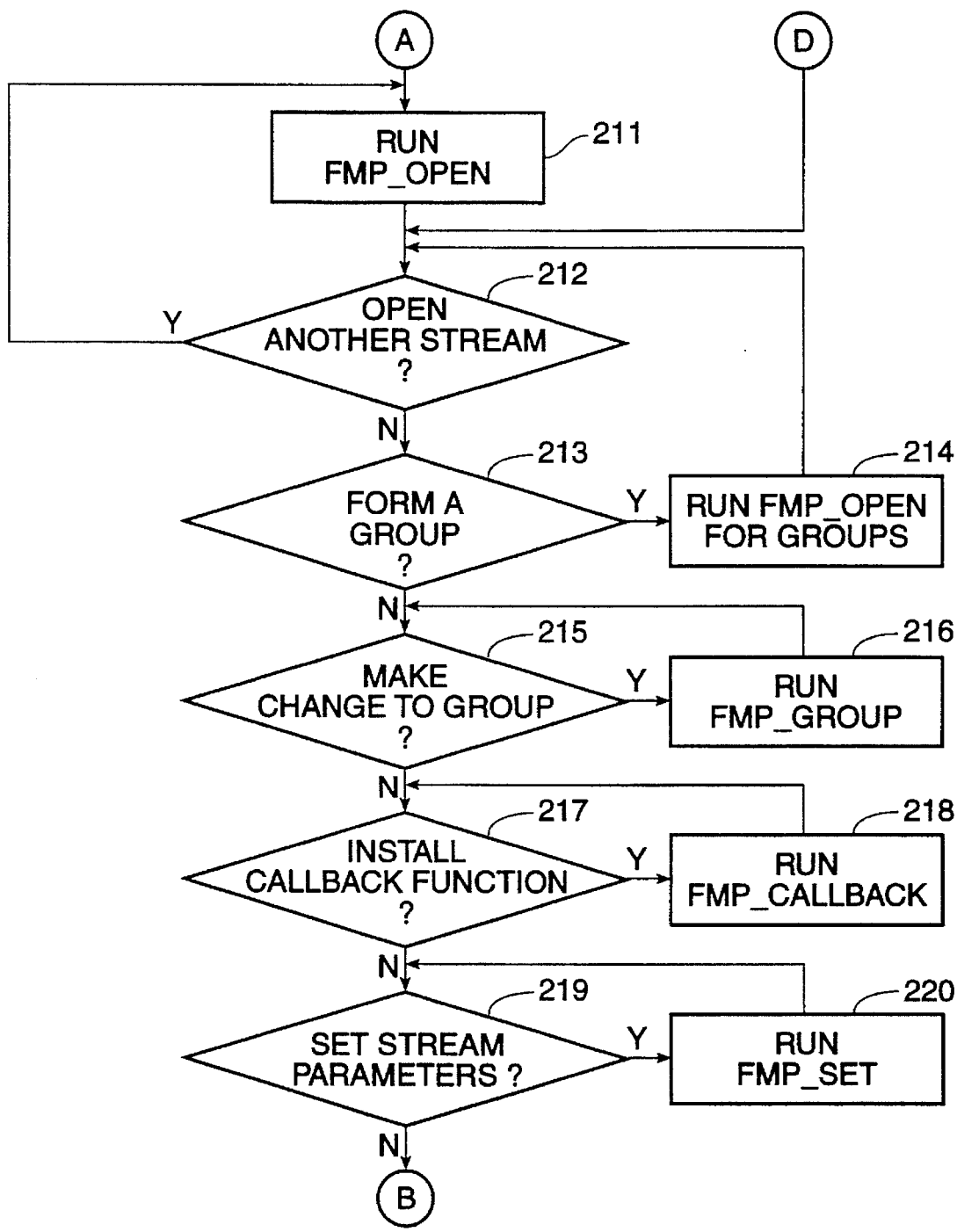
Figure 2C:
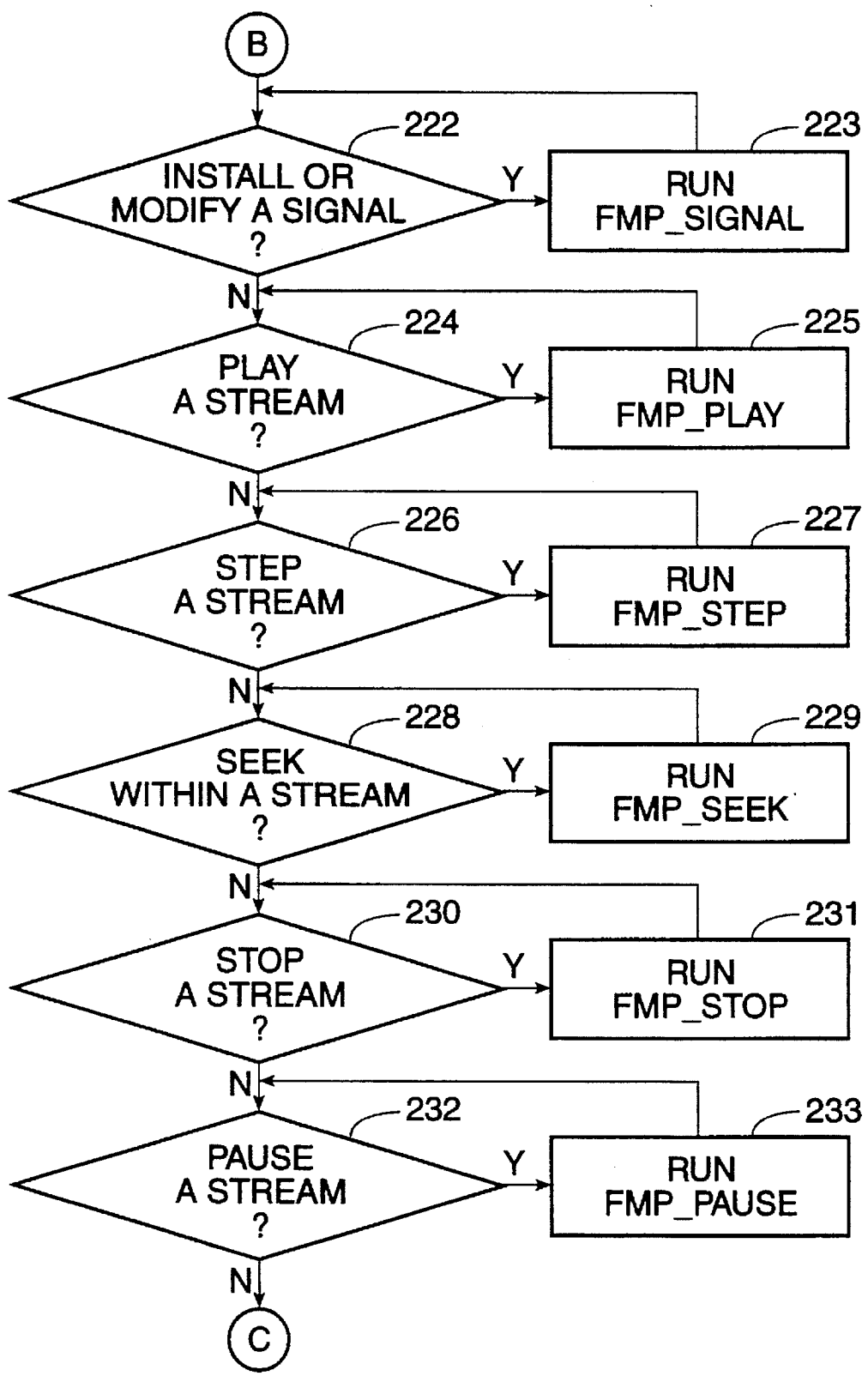
Figure 2D:
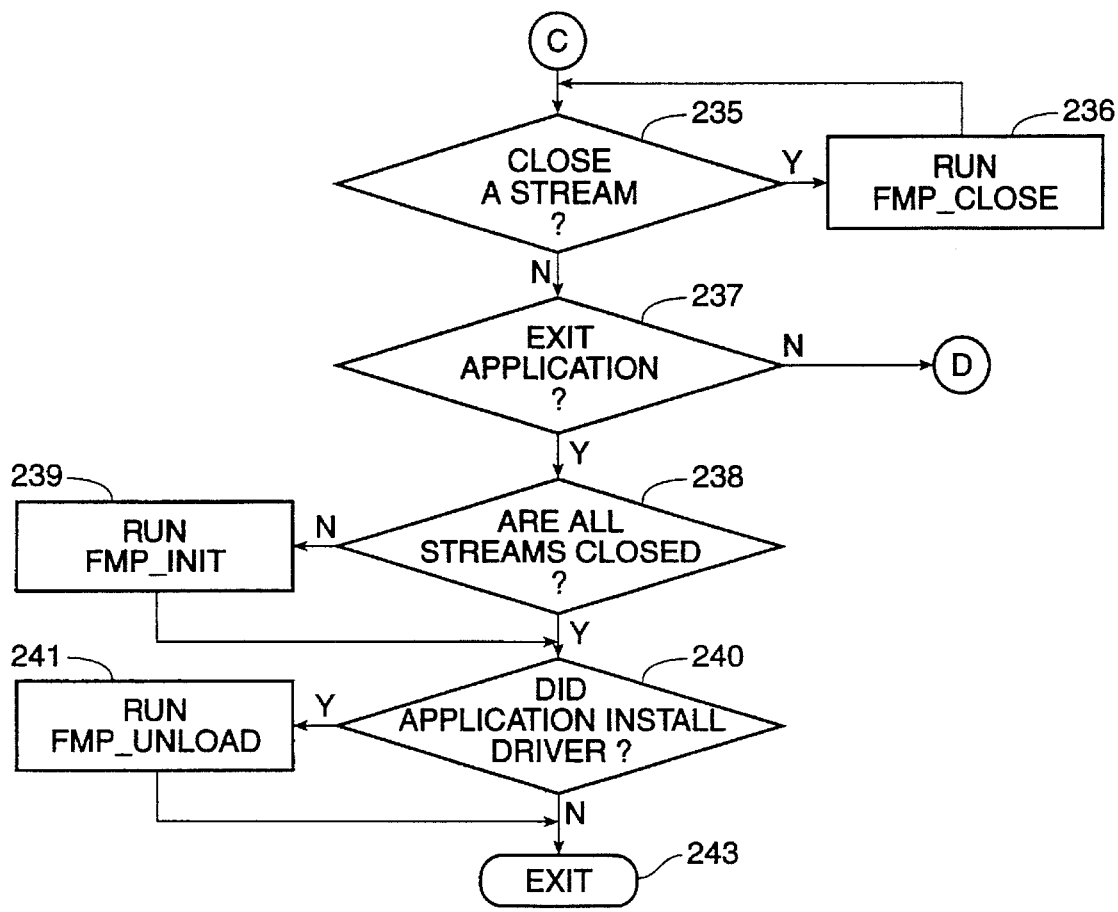

Those skilled in the art would readily understand, after perusal of this application, that methods and techniques described for operation on a processor or computer system would be readily implemented on digital computer systems such as those described herein without undue experimentation. Accordingly, detailed description of computer programing techniques or methods of implementation are not set forth herein, except where such techniques or methods are specific to the invention.

Information in this application may be supplemented by a technical appendix, appearing at the end of this text. The technical appendix is an integral part of the disclosure of this application, and moreover is hereby incorporated by reference as if fully set forth herein.

SYSTEM INCLUDING PRESENTATION DEVICE

FIG. 1 shows a block diagram of a computer system including a video data presentation device.

A computer system 101 may comprise a processor 102, memory 103, and mass storage 104, all coupled to a system bus 105. For example, in a preferred embodiment, the computer system 101 may comprise an IBM compatible PC, having an Intel 386 processor operating at 25 MHz or better, with at least 2 MB of RAM and at least 2 MB of space free on a magnetic disk drive mass storage unit, and having an ISA or EISA bus. Such systems are known in the art.

The computer system 101 may also comprise a video and audio presentation device 106. In a preferred embodiment, the presentation device 106 may comprise a VGA display controller that supports a VESA feature connector, and a peripheral device such as the "Reel Magic" product (available from Sigma Designs Corporation, of Fremont, Calif.). The memory 103 may comprise an operating system 107, such as MS-DOS 6.2 or a variant thereof, and a driver program 108 as disclosed herein. The driver program 108 may sometimes be referred to herein as the "FMP DOS" driver.

In a preferred embodiment, the presentation device 106 may be coupled to the system bus 105 using a known methods for coupling an add-in board to the system bus 105, such as the ISA or EISA specification for a device to bus coupling. The processor 102 may communicate with the presentation device 106 by means of the bus 105, or by means of reading from and writing to the memory 103; communication techniques therefor are known in the art.

In a preferred embodiment, a data stream 109 comprising video or audio data for presentation, may be held in memory 103, in mass storage 104, or may be received by the computer system 101 from another peripheral device, such as a video camera or audio microphone, or from a communication medium, such as a network or telephone connection. Such other devices and communication media are known in the art. Such other devices may be coupled to the computer system 101 by means of the system bus 105, by means of a direct connection to memory 103, or by other known means.

In a preferred embodiment, the FMP DOS driver program 108 may have the following commands:

| | |
|---|---|
| FMP_INIT | initialize the driver program 108 |
| FMP_OPEN | open a data stream 109 |
| FMP_CLOSE | close a data stream 109 |
| FMP_PLAY | present ("play") a data stream 109 |
| FMP_PAUSE | pause a data stream 109 |
| FMP_STOP | stop a data stream 109 |
| FMP_SEEK | locate ("seek") a designated position in a data stream 109 |
| FMP_STEP | increment the position of a data stream 109 by one video frame |
| FMP_GROUP | designate data streams 109 as a group |
| FMP_SET | set a parameter of the driver program 108 or a data stream 109 |
| FMP_GET | get a parameter of the driver program 108 or a data stream 109 |
| FMP_CALLBACK | install a callback function for a data stream 109 |
| FMP_SIGNAL | install a signal for a data stream 109 |
| FMP_UNLOAD | terminate the driver program 108 and unload it from memory |

These commands are described in more detail herein.

In a preferred embodiment, when an application program, stored in memory 103 or in mass storage 104 and controlling the processor 102, desires to use the capabilities of the presentation device 106, it may execute an interrupt instruction with a designated interrupt, and thus cause the processor 102 to generate an interrupt, as is known in the art. The interrupt may be responded to by the operating system 107, which may direct the interrupt to a driver program 108.

In a preferred embodiment, the operating system 107 may be responsive to a calling sequence used by the application program to command the driver program 108. In a preferred embodiment, the driver program 108 may comprise a unified calling sequence for each of its functions, so that all calls to the driver program 108 may be easily identified by the operating system 107.

As noted herein, in a preferred embodiment, the computer system 101 may comprise an Intel 386 processor 102; such a processor may comprise a set of 16-bit registers including AX, BX, CX, and DX registers. In a preferred embodiment, a unified calling sequence may comprise registers BX, CX, DX and AX, and may be as follows:

BH command identifier

BL identifier for data stream (sometimes called a "stream handle")

The symbols BH and BL identify high and low halves of register BX.

CX data flags

DX (with AX) 32-bit data value or data pointer, with the high half in DX and the low half in AX In a preferred embodiment, no registers other than BX, CX, DX and AX will be read by the FMP DOS driver program 108.

In a preferred embodiment, a unified return sequence may comprise registers BX, CX, DX and AX, and may be as follows:

BH error code, if any

BL DOS error code, if BH indicates a DOS error

DX (with AX) 32-bit return data value or data pointer, with the high half in DX and the low half in AX In a preferred embodiment, no registers other than BX, CX, DX and AX will be modified by the FMP DOS driver program 108.

INTERFACE BETWEEN APPLICATION AND DRIVER PROGRAM

FIGS. 2A, 2B, 2C, and 2D (collectively "FIG. 2") show a flow diagram of an interface between an application program and a device for presenting video and audio data.

At step 201, the application program may determine whether the driver program 108 is installed. If so, the process proceeds with step 202, where the application program issues a command to install the driver program 108. Thereafter, the process proceeds with step 203.

In a preferred embodiment, the driver program 108 may be loaded before the application program starts. The driver program may install itself by seizing an unused interrupt within the range 80h to FFh. The driver program 108 may then store a predetermined text string such as "FMPDriver" relative to a location pointed to by the interrupt vector. At an offset of +2, a Pascal-type string may be stored; at an offset of +3, a C-type string may be stored. Pascal-type and C-type strings are known in the art.

In step 201, to determine whether the driver program 108 is installed, the application program may search the list of interrupt vectors for the installed driver.

In step 202, to install the driver program 108, the application program may search for the location of the driver program 108 in a predetermined location. In a preferred embodiment, this predetermined location may be a DOS environment variable, "FMPDriver", whose value has been preset to a pathname of a DOS executable file for the driver program 108, such as "FMPDRV.EXE". Upon finding the driver program 108, the application program may start the driver program 108 and reexecute step 201 to determine if the driver program 108 was successfully installed.

At step 203, the application program may issue the FMP_INIT command to initialize the driver program 108. This command may reset the presentation device 106 and set any variables in the driver program 108 to their default values.

At step 204, the application program may issue the FMP_GET command to get information about the driver program 108, such as its name, version, and a set of state information about the presentation device 106.

At step 205, the application program may determine whether to install a "callback" function with the driver program 108. If so, the process proceeds with step 206, where the application program may issue the FMP_CALLBACK command to install a callback function with the driver program 108. Thereafter, the process proceeds with step 207.

A callback function is a function within the application program that may be called by the driver program 108, to provide feedback information to the application program. For example, the driver program 108 may call the callback function to provide information on the state of an operation that the presentation device 106 is still working on.

In a preferred embodiment, the application program may define one callback function for each data stream 109. If a data stream 109 has no callback function defined for it, a default callback function provided by the driver program 108 may be called instead (if one exists). In step 206, the application program may call the FMP_CALLBACK function with a value for a data stream 109 that is a null indicator to specify the default callback function as the callback function to use.

In a preferred embodiment, the specified callback function may be called with a calling sequence that is standard for the language that function is written in, e.g., a Pascal standard calling sequence or a C standard calling sequence. Pascal standard calling sequences and C standard calling sequences are known in the art. Arguments may be passed in registers or on a calling stack, as is known in the art.

When arguments are passed in registers, the following calling sequence may be used:

BH message identifier

BL identifier for data stream (sometimes called a "stream handle")

DX (with AX) 32-bit data value or data pointer, with the high half in DX and the low half in AX Register DX (with AX) are referred to as the "value". In a preferred embodiment, a zero value may be returned if the operation was a success.

In a preferred embodiment, one of the following messages may be passed to the callback function:

| | |
|---|---|
| FMPM_ERROR | An error occurred while executing a command given by the application program. The value may comprise an error code, which may comprise one of the following error codes: |
| FMPE_DOS | A DOS error occurred while reading the data stream 109. Register AL may comprise the DOS error code. |
| FMPE_HARDWARE | A hardware error occurred with the presentation device 106. Register AL may comprise information about the error. |
| FMPE_STREAM | The data stream 109 comprises invalid data. |
| FMPE_DATA | The data stream 109 has no available data. |
| FMPM_SIGNAL | This message is issued when the data stream 109 reaches a position specified with the FMP_SIGNAL command, or when a period has completed. The value may comprise the current position of the data stream 109. |
| FMPM_COMPLETE | This message is issued when a command issued by the application program has been completed, for example when a "play" command has ended. The data stream 109 will be in a ready mode, i.e., paused or stopped. The value may comprise the command identifier for the completed command. |
| FMPM_CANCEL | This message is issued when a new command has been sent by the application program before the previous command was completed. The value may comprise the command identifier for the canceled command. |
| FMPF_BUF_CREATE | This message is sent when a buffered data stream 109 is opened. The application program may allocate and initialize buffers upon receiving this message. The value may comprise the value passed by the application program to the FMP_OPEN command, and a zero value may be returned on success. |
| FMPF_BUF_CLOSE | This message is sent when a buffered data stream 109 is to be closed. The application program may release any memory allocated for the buffer when this message is received. |
| FMPF_BUF_SEEK | This message is sent to the application program to seek to a given position in bytes. The value may comprise the position to reach, in bytes. |
| FMPM_BUF_EMPTY | This message is sent to the application program when the buffer for a buffered data stream 109 is empty and more data is needed to complete the command issued by the application program. The application program may specify an address for a new buffer with the FMP_SET -- FMPI_BUF_ADDR command. Alternatively, the application may set FMPI_BUF_LOOP to cause the driver program to scan the same buffer again. Otherwise, the data stream 109 will be stopped. |
| FMPM_BUF_POS | This message is sent to the application program when the buffer for a buffered data stream 109 reaches a position indicated when the data stream 109 was initiated (using the FMPI_BUF_POS parameter). When the data stream 109 is played, the application program will generally receive this message before it receives FMPM_BUF_EMPTY, so it does not have to prepare the first buffer before opening the data stream 109. |

At step 207, the application program may determine whether to set parameters for the presentation device 106 or the driver program 108. If so, the process continues with step 208, where the application program may issue the FMP_SET command to the driver program 108. Thereafter, the process continues with step 209.

In step 208, the application program may issue the FMP_SET command to prepare the presentation device 106 or the driver program 108 for the particular types of data stream 109 that the application program will seek to present.

At step 209, the application program may determine whether to open a new data stream 109. If not, the process repeats step 209 until the determination is YES. Thereafter, the process proceeds with step 211.

In step 209, the application program effectively loops until it seeks to open a new data stream 109, for example, its first data stream 109. In a preferred embodiment, there are two elementary types of data stream 109, those comprising only video data and those comprising only audio data. There are also more complex data streams 109; one such is an interleaved data stream 109, which may comprise both video data and audio data interleaved together.

When an application program opens an interleaved data stream 109, the driver program 108 may generate a group data stream 109, comprising the individual video and audio component data streams 109, grouped together for synchronization. Thus, when the application program seeks to present the group data stream 109, the video and audio component data streams 109 will be presented together in synchrony.

At step 211, the application program may open a data stream 109 by issuing the FMP_OPEN command.

At step 212, the application program may determine whether to open another data stream 109. If so, the process may continue with step 211.

The application program may loop over steps 211 and 212 until it has opened all the data streams 109 it seeks to open.

In a preferred embodiment, the driver program 108 may open up to 255 data streams 109, each of which may have its own characteristics. These characteristics may comprise speed (i.e., speed of presentation), window size (i.e., the size of the video image for presentation), volume (i.e., the volume of sound presentation, time format (i.e., the number of frames per second). In a preferred embodiment, characteristics of a data stream 109 may vary depending upon whether it is a video or an audio data stream.

At step 213, the application program may determine whether to form a group data stream 109. If so, the process continues with step 214, where the application program may issue the FMP_OPEN command to open a new group data stream 109, and may proceed thereafter to step 212. Otherwise, the process continues with step 215.

In a preferred embodiment, a group data stream 109 may comprise more than one elementary data stream 109. As with other data streams 109, the application program may issue commands with regard to a group data stream 109, such as to play, to stop, to step forward, to seek the data stream 109 to a designated location. Commands issued with regard to a group data stream 109 may apply to each of the elementary data streams 109 it comprises.

An application program may also select and deselect data streams 109 within a group data stream 109; it may thus designate which data streams 109 within the group data stream 109 should be affected by a command. This may be useful, for example, when a group data stream 109 comprises several tracks of audio data streams 109. The application program may thus select which of the several audio tracks to play.

At step 215, the application program determines whether to make a change to a group data stream 109. The process continues with step 214, where the application program may issue the FMP_GROUP command to add, remove, select, or deselect a data stream 109 from the group data stream 109, and may proceed thereafter to step 215 again. Thereafter, the process proceeds with step 217.

The application program may loop over steps 215 and 216 until it has made all the changes to the group data stream 109 it seeks to make.

At step 217, the application program may determine whether to install a callback function for any of the data streams 109 or group data streams 109 it has opened. If so, the process proceeds to step 218, where the application program may issue the FMP_CALLBACK command, in similar manner as in step 206, and may proceed thereafter to step 217 again. Thereafter, the process proceeds with step 219.

The application program may loop over steps 217 and 218 until it has installed all the callback functions it seeks to install.

At step 219, the application program may determine whether to set parameters for any data streams 109. If so, the process proceeds to step 220, where the application program may issue the FMP_SET command to set parameters, and may proceed thereafter to step 219 again. Thereafter, the process proceeds with step 222.

At step 222, the application program may determine whether to install a new signal for a data stream 109 or to modify an existing signal for a data stream 109. If so, the process proceeds with step 223, where the application program may issue the FMP_SIGNAL command to install a new signal or to modify an existing signal, and may proceed thereafter with step 222 again. Thereafter, the process proceeds with step 224.

The application program may loop over steps 222 and 223 until it has installed all the signals it seeks to install.

In a preferred embodiment, a signal may be a mechanism to inform the application program when a designated location in a data stream 109 has been reached by the presentation device 106. If that location is reached and the application program has installed a signal for a data stream 109, the driver program 108 will call the installed callback function for that data stream 109 with the message FMPM_SIGNAL. The application program may receive this message and use the information to perform a designated procedure, to issue other commands, or to call upon the operating system 107 to trigger other system events. In a preferred embodiment, each data stream 109 may have only one signal outstanding at a time.

At step 224, the application program may determine whether to present (also called "play") a data stream 109. If so, the process proceeds with step 225, where the application program may issue the FMP_PLAY command to cause the presentation device 106 and the driver program 108 to present the data stream 109, and may proceed thereafter with step 224 again. Thereafter, the process proceeds with step 226.

At step 226, the application program may determine whether to step a data stream 109 forward. If so, the process proceeds with step 227, where the application program may issue the FMP_STEP command to cause the presentation device 106 and the driver program 108 to step the data stream 109 forward one frame, and may proceed thereafter with step 226 again. Thereafter, the process proceeds with step 228.

At step 228, the application program may determine whether to seek a designated location within a data stream 109. If so, the process proceeds with step 229, where the application program may issue the FMP_SEEK command to cause the presentation device 106 and the driver program 108 to seek a designated location in the data stream 109, and may proceed thereafter with step 228 again. Thereafter, the process proceeds with step 230.

At step 230, the application program may determine whether to stop a data stream 109. If so, the process proceeds with step 231, where the application program may issue the FMP_STOP command to cause the presentation device 106 and the driver program 108 to stop the data stream 109, and may proceed thereafter with step 230 again. Thereafter, the process proceeds with step 232.

At step 232, the application program may determine whether to pause a data stream 109. If so, the process proceeds with step 233, where the application program may issue the FMP_PAUSE command to cause the presentation device 106 and the driver program 108 to pause the data stream 109, and may proceed thereafter with step 232 again. Thereafter, the process proceeds with step 235.

In a preferred embodiment, a data stream 109 may comprise one of a set of "play modes", each of which may designate a status of the data stream 109. These play modes may be as follows:

| | |
|---|---|
| STOP mode | The data stream 109 is stopped. There is no video picture and no audio sound. |
| PAUSE mode | The data stream 109 is paused. For an audio data stream 109, this is the same as STOP mode. For a video data stream 109, the last (most recent) video frame is held frozen in a presentation frame window. |
| PLAY mode | The data stream 109 is playing, i.e., being presented by the presentation device 106. This mode is valid for both video and audio. |
| SEEK mode | The data stream 109 is moving to a designated location. This mode is valid for both video and audio. |
| STEP mode | The data stream 109 is moving forward one frame. This mode is valid for video data streams 109 only. |

The PAUSE mode and the STOP mode may be termed "ready" modes. In a preferred embodiment, if the application program issues a command and the data stream 109 is not in a ready mode, the command is canceled and the application program callback function is called with the FMPM_CANCEL message.

In a preferred embodiment, when the application program issues a command to enter PLAY mode, SEEK mode, or STEP mode, it may also designate the mode to enter when that command is completed. The application program may designate PAUSE mode, STOP mode, or the previous ready mode (i.e., the ready mode the data stream 109 was in before the new command).

In a preferred embodiment, the driver program 108 will cause control to return to the application program as soon as possible. Control may thus be returned before the command is completed. The application program may obtain the current mode for the data stream 109 by issuing the FMP_GET command and waiting for the command to complete. When the command is completed, the driver program 108 will call the callback function for the data stream 109 with the FMPM_COMPLETE message.

It may occur that a first data stream is in PLAY mode (i.e., it is being presented by the presentation device 106), and the application program seeks to present a second, different, data stream 109. In a preferred embodiment, if the presentation device is unable to present both data streams 109 at once, the FMP_PLAY command for the second data stream 109 is given priority. The first data stream 109 will have its PLAY mode canceled, and it will be returned to the mode it would normally have if its PLAY mode has completed normally, and the callback function for the first data stream 109 will be called with the FMPM_CANCEL message.

At step 235, the application program may determine whether to close a data stream 109. If so, the process proceeds with step 236, where the application program may issue the FMP_CLOSE command to close the data stream 109, and may proceed thereafter with step 235 again. Thereafter, the process proceeds with step 237.

At step 237, the application program may determine whether to exit. If not, the process proceeds with step 212 (label D). Otherwise, the process proceeds with step 238.

At step 238, the application program may determine whether all data streams are closed. If not, the process proceeds with step 239, where the application program may issue the FMP_INIT command to close all open data streams 109 and reset the presentation device 106. Thereafter, the process proceeds with step 240.

At step 240, the application program may determine whether it installed the driver program 108. If so, the process proceeds with step 241, where the application program may issue the FMP_UNLOAD command to deinstall the driver program 108. Thereafter, the process proceeds with step 243, where it is complete and the application program may exit.

DRIVER PROGRAM FUNCTIONS

Figure 3:
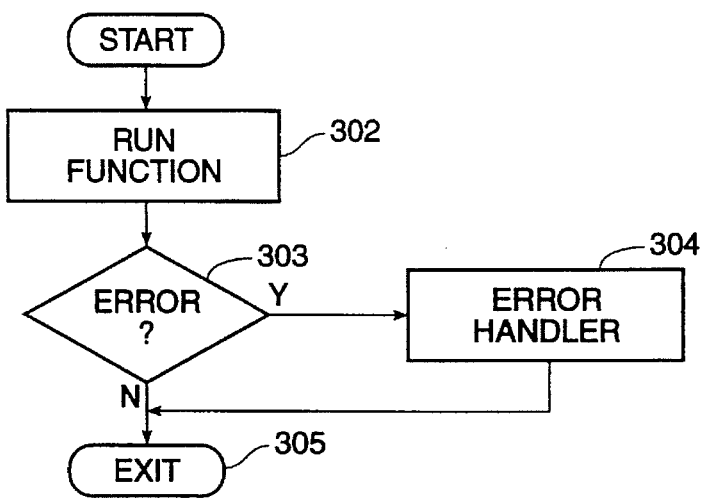
FIG. 3 shows a flow diagram of a responsive procedure for a device for presenting video and audio data.

FIG. 3 shows a flow diagram of a responsive procedure for a device for presenting video and audio data.

In a preferred embodiment, an application program may issue a command to the driver program 108 to cause it to perform one of a set of functions. As noted herein, issue of that command may use a designated interrupt and a designated calling sequence. In a preferred embodiment, the driver program 108 may proceed as follows:

At step 302, the driver program 108 may run function associated with the command issued by the application program.

At step 303, the driver program 108 may determine whether the function caused an error. If so, the process proceeds with step 304, where the driver program 108 may run an error handler program. Thereafter the process proceeds with step 305, where it is complete and the driver program 108 may exit.

For each command, the application program may specify a flag FMPF_TEST. This flag instructs the driver program 108 to return a value specifying whether the driver program 108 and the presentation device 106 supports that command, but to abstain from making any "real" changes.

The following pages A8—A24 describe commands that may be implemented in a preferred embodiment of the driver program 108.

ALTERNATIVE EMBODIMENTS

While preferred embodiments are disclosed herein, many variations are possible which remain within the concept and scope of the invention, and these variations would become clear to one of ordinary skill in the art after perusal of the specification, drawings and claims herein.

We claim:

1. A computer system for presenting video or audio data, comprising a processor;

memory coupled to said processor;

means for presenting video and audio data coupled to said memory;

an application program having an execution point in said memory;

means for signaling an interrupt from said application program;

a driver program in said memory, coupled to said means for signaling an interrupt and to said means for presenting video and audio data;

a first and a second data stream, said first and second data streams each comprising video or audio data, and said first and second data streams each coupled to said processor;

said driver program comprising a plurality of functions each callable from said application program with a common calling sequence, whereby said means for signaling an interrupt directs said interrupt to said driver program;

said plurality of functions comprising a function for designating said first and second data streams as a group, a function for causing a plurality of data streams in a group to change status in synchrony into a PLAY mode, a PAUSE mode, a STOP mode, a SEEK mode, or a STEP mode, a function for designating a callback function independently for said group or for said first data stream, a function for designating a signal independently for said group or for said first data stream, a function for designating a buffer in said memory as a location for data associated with said first data stream.

2. A computer system as in claim 1, wherein said application program generates video or audio, or both, in response to data said application program retrieves from a file in said computer system, or from a source device coupled to said computer system.

3. A computer system as in claim 2, wherein said source device comprises a video camera, an MPEG capture device, or a communication device.

4. Apparatus for presenting data in a computer system, comprising
   means for presenting video and audio data;
   means for signaling an interrupt from an application program;
   a driver program coupled to said means for signaling an interrupt and to said means for presenting video and audio data;
   a first and a second data stream, said first and second data streams each comprising video or audio data;
   said driver program comprising a plurality of functions each callable from said application program with a common calling sequence, whereby said means for signaling an interrupt directs said interrupt to said driver program;
   said plurality of functions comprising a function for designating said first and second data streams as a group, a function for causing a plurality of data streams in a group to change status in synchrony into a PLAY mode, a PAUSE mode, a STOP mode, a SEEK mode, or a STEP mode, a function for designating a callback function independently for said group or for said first data stream, and a function for designating a signal independently for said group or for said first data stream.

5. Apparatus as in claim 4, wherein said common calling sequence comprises:
   a set of registers providing both input and output transfer, said set of registers having
   a first register defining a high and low register space, wherein during said input transfer said high register space is reserved for an indicator of one of said plurality of functions to be called, and said low register space is reserved for an indicator for a data stream to be manipulated;
   a second register reserved for a set of data flags; and
   a third register and a fourth register in combination reserved for a modifiable data value or data pointer.

6. Apparatus as in claim 4, wherein said driver program comprises means for calling said callback function in response to a plurality of predetermined conditions, said plurality of predetermined conditions including a plurality of different predetermined error conditions, a condition indicative of said designated signal, a condition indicative of a completed operation for said first data stream, a condition indicative of a canceled command to said driver program, a condition indicative of allocation or deallocation of a buffer comprising video or audio data for presentation from said first data stream, and a plurality of different conditions indicative of progress of presentation of video or audio data from said buffer.

7. Apparatus as in claim 4, wherein said plurality of functions comprises a first function for presenting a stream of video or audio data, and a second function for cancelling said command, wherein when said first function is issued for a first data stream and said first function is issued for a second data stream before said first data stream is completed, said first function for said first data stream is cancelled according to said second function.

8. Apparatus as in claim 4, wherein said plurality of functions comprises a first function for presenting a first stream of video or audio data, and a second function for simultaneously cancelling said first function and issuing said first function for a second stream of video or audio data, whereby a presentation is transitioned smoothly from said first stream to said second stream without significant time in between.

9. Apparatus as in claim 4, wherein said plurality of functions comprises a function for adding or removing a data stream from said group and a function for selecting or deselecting a data stream within said group without altering the membership of said group.

10. Apparatus as in claim 4, wherein said plurality of functions comprises a function for causing said first data stream to change status into a first mode, said first mode comprising a PLAY mode, a PAUSE mode, a STOP mode, a SEEK mode, or a STEP mode, said function comprising means for designating a second mode for said first data stream to change status into after a completion of said function, said second mode comprising a PLAY mode, a PAUSE mode, a STOP mode, a SEEK mode, or a STEP mode.

11. Apparatus as in claim 4, wherein said plurality of functions comprises a function for initializing said driver program, a function for opening or closing said first data stream, a function for causing said first data stream to change status into a PLAY mode, a PAUSE mode, a STOP mode, a SEEK mode, or a STEP mode, a function for getting or setting parameters of said driver program or said first data stream, and a function for terminating said driver program.

12. Apparatus as in claim 4, wherein said plurality of functions comprises
   means for determining whether said first data stream is in a ready mode; and
   means responsive to said means for determining and responsive to a function for changing a status of said second data stream, for signaling a condition indicative of a canceled command to said driver program.

13. Apparatus as in claim 4, wherein said plurality of functions comprises
   means for receiving a flag indicative of a test call for a function; and
   means responsive to said means for receiving for disabling operations of said driver program other than indicating whether said function is supported by said driver program.

14. Apparatus as in claim 4, wherein said signal comprises a condition where said means for presenting reaches an arbitrary point in said first data stream, said arbitrary point having been designated by said application program and being other than a start or end point for said first data stream.

* * * * *